June 7, 1955   J. A. MERRIMAN   2,710,054
SAFETY DEVICES FOR TIRE INFLATION
Filed Dec. 17, 1951   2 Sheets-Sheet 1
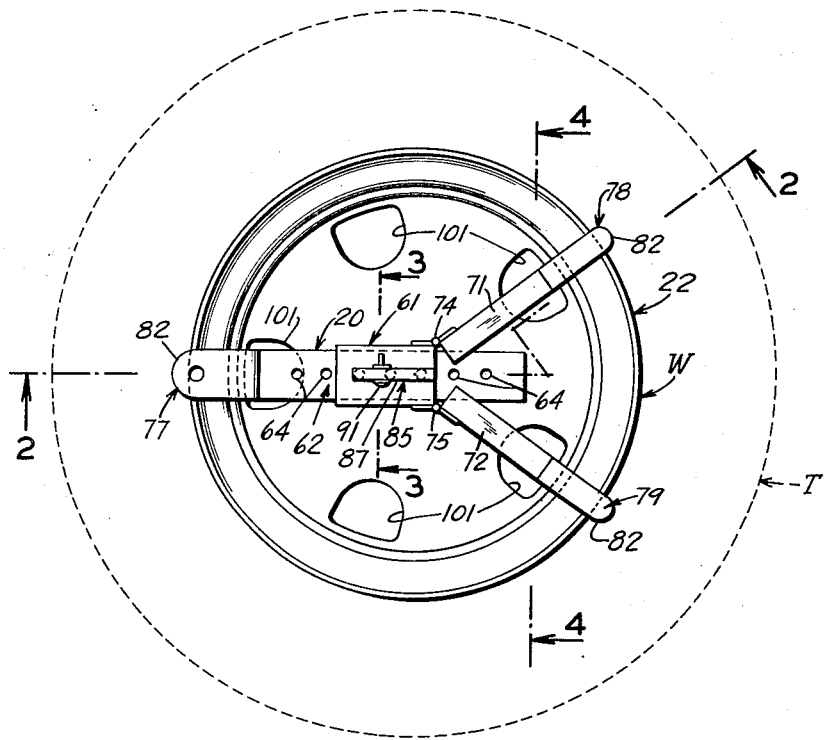
FIG. 1
FIG. 2
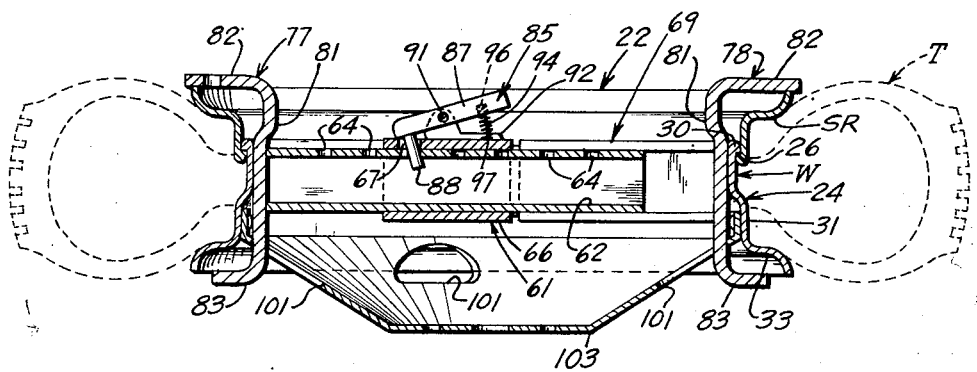
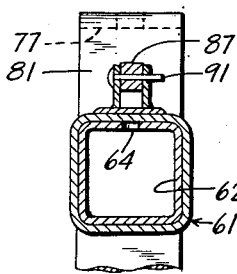
FIG. 3
*INVENTOR.*
JOHN A. MERRIMAN
BY *Wallace and Cannon*
ATTORNEYS June 7, 1955 J. A. MERRIMAN 2,710,054
SAFETY DEVICES FOR TIRE INFLATION
Filed Dec. 17, 1951 2 Sheets-Sheet 2
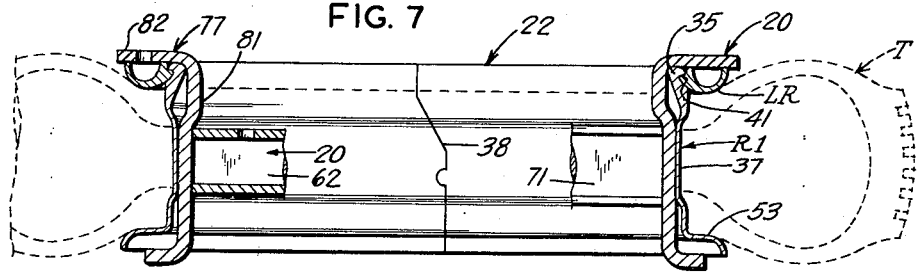
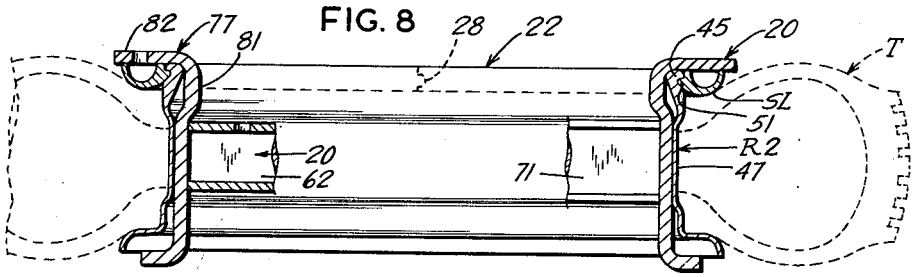
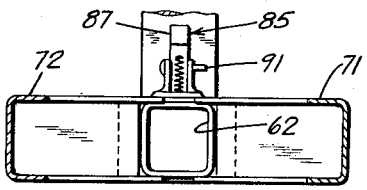
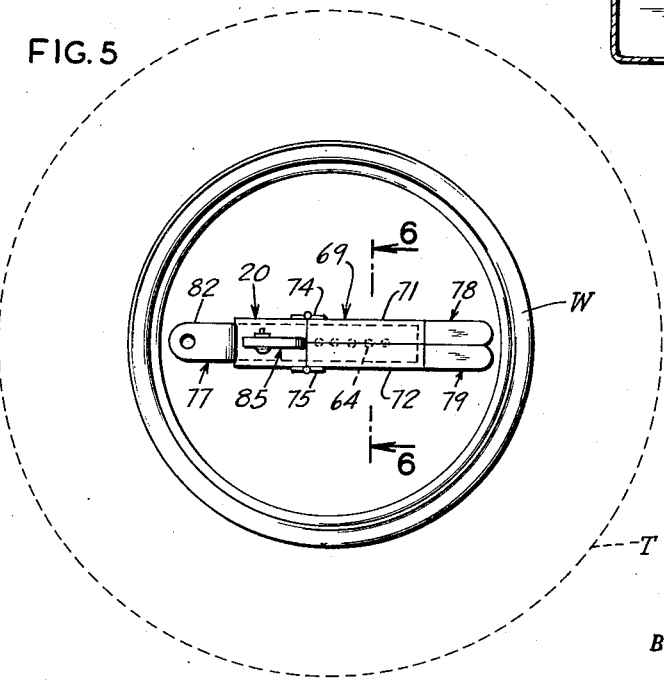
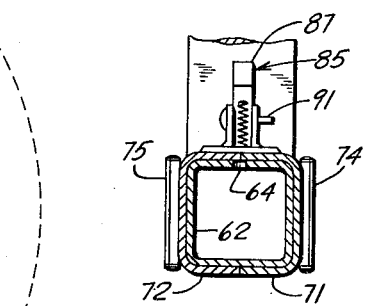
INVENTOR.
JOHN A. MERRIMAN
BY Wallace and Cannon
ATTORNEYS

United States Patent Office 2,710,054
Patented June 7, 1955

2,710,054

SAFETY DEVICES FOR TIRE INFLATION

John A. Merriman, Chicago, Ill.

Application December 17, 1951, Serial No. 262,057

3 Claims. (Cl. 157—1)

This invention relates to safety devices and more particularly to safety devices for holding retaining rings, and the like, on wheels, rims, and the like during the inflation of pneumatic tires on such wheels and rims.

The inflation of the larger pneumatic tires such as, for example, those used on larger trucks, buses and similar automotive vehicles, and the like, has always been considered a dangerous operation. Such tires are commonly held in position on rims and wheels by means of removable devices commonly referred to in the trade as lock rings, and side rings, which, if defective or not properly installed in operative position on the rim or wheel, are subject to being violently dislodged or "blown" from the wheel or rim during inflation of the tire.

Such lock rings and side rings are used differently in different installations. Thus, for example, in some installations a single lock ring is used; in other installations a single side ring may be used; and in other installations such rings may be used in combination such as, for example, a side ring together with a lock ring. Herein, the term "retainer ring" is used as a general term embracing all such installations whether the rings are used independently or in combination.

Many serious injuries, including deaths, have been caused in the past, and are still being caused, by the "blowing" of side rings and lock rings during inflation of heavy tires. Such rings when blown from a rim or wheel during inflation of such tires are commonly thrown therefrom, with such violence that the person doing the inflating and, in fact, others who may be standing nearby may be considered fortunate if they are merely badly injured and not killed. In many instances such persons are struck in the head, face, neck of the like, with such force by the dislodged ring that they are killed outright or that death ensues shortly from the blow. The more "fortunate" other persons, who are merely injured often, and it may be said usually, suffer skull fractures, brain concussions, smashed faces, cut necks or throats, broken or mangled arms, hands, and the like.

It is the primary object of my invention to afford a novel safety device for effectively preventing such mishaps from occurring during the inflation of such tires.

Another object of my invention is to provide a novel, readily portable safety device which may be quickly and easily mounted in operative position on such a wheel or rim prior to inflating a tire mounted on such wheel or rim, and which safety device when so mounted may be relied upon to effectively hold the retainer ring from being dangerously dislodged from the wheel or rim during inflation of the tire.

A further object is to afford a novel safety device of the aforementioned character which is readily adjustable for use on various types and sizes of wheels and rims.

Yet another object is to afford a novel safety device of the aforementioned character which, when installed in operative position on a wheel or rim is effective to hold the retaining ring thereof without confining or undesirably limiting the operator's movements, and without requiring that the wheel or rim be placed in special, inaccessible positions or locations.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention.

In the drawings:

Fig. 1 shows the preferred form of safety device embodying the principles of my invention mounted on a wheel;

Fig. 2 is a sectional view taken substantially along the line 2—2 in Fig. 1;

Fig. 3 is a detail sectional view taken substantially along the line 3—3 in Fig. 1;

Fig. 4 is a detail sectional view taken substantially along the line 4—4 in Fig. 1;

Fig. 5 is a top plan view of the safety device shown in Fig. 1 in a somewhat different position and disposed in a position which it typically occupies during the mounting thereof on a rim;

Fig. 6 is a detail sectional view taken substantially along the line 6—6 in Fig. 5;

Fig. 7 is a sectional view, with parts broken away, showing the device shown in Fig. 1 disposed in operative position on a rim of the split rim-solid ring type; and Fig. 8 is a sectional view similar to Fig. 7, but showing the device disposed in operative position on a rim of the solid rim-split ring type.

To illustrate the preferred embodiment of my invention, a safety device 20, embodying the principles of my invention, is shown in the drawings mounted on various types of wheel units 22, namely, on a wheel W having a tire T mounted thereon, Fig. 1; a rim R1 of the split rim-solid ring type having a tire T mounted thereon, Fig. 7; and a rim R2 of the solid rim-split ring type having a tire T mounted thereon, Fig. 8.

It will be seen that each of the wheel units 22 includes a retaining ring of one type or another. Thus, the wheel W includes a retaining ring SR, of a type commonly referred to in the trade as a side ring; the rim R1, Fig. 7, has a solid locking ring LR mounted thereon; and the rim R2, Fig. 8, has a split locking ring SL mounted thereon, the ring SL being split as at 28, Fig. 8.

The side ring SR, Figs. 1 and 2, constitutes a removable portion of the rim 24 of the wheel W. The side ring SR is of solid construction and has a lip or flange 26 which, when the ring SR is disposed in operative, tire-retaining position on the wheel W, is disposed inwardly of and in abutting engagement with a complementary lip or flange 30 on the body portion 31 of the rim 24.

In mounting a tire T on the wheel W, Fig. 2, the tire T, while in deflated condition, is slipped downwardly over the relatively small flange 30 into position on the body portion 31 of the rim 24. Thereafter, the side ring SR is slipped down into the space between the deflated tire T and the body portion 31 of the rim 24 on the wheel W and, by the use of suitable tools, is forced into operative position on the rim 24 wherein the flange 26 on the side ring SR is disposed in the aforementioned abutting relation to the flange 30 to thereby releasably "lock" the side ring SR and the body portion 31 of the rim 24 together.

Thereafter, the tire T is inflated, which, of course, forces the beads B thereof outwardly against the side ring SR and the similarly shaped side flange 33 of the body portion 31 of the rim 24.

In mounting a tire T on the rim R1, Fig. 7, the tire T, while in deflated condition, is slipped downwardly over a relatively small locking flange 35 on the body portion 37 of the rim R1. The body portion 37 of the rim R1 is split as at 38, and during mounting of the tire T and the lock ring LR thereon the edges of the rim defining the split 38 are disposed out of abutting relation to each other. After mounting the tire T on the body portion 37, the lock ring LR is forced onto the body portion 37 into position wherein a lip or flange 41 on the lock ring LR is disposed inwardly of, and in abutting relation to, the flange 35 on the body portion 37 of the rim R1. The body portion 37 is then forced outwardly by the use of suitable tools into position wherein the parts thereof forming the opposite sides of the split 38 are disposed in abutting relation to each other which expands the flange 35 into closer engagement with flange 41 on the lock ring LR, to thereby releasably lock the ring LR and the body portion 37 of the rim R1 together.

Thereafter, the tire T is inflated which forces the beads B thereof outwardly against the locking ring LR and the similarly shaped side flange 43 of the body portion 37 of the rim R1.

In mounting a tire T on the rim R2, Fig. 8, the tire T while in deflated condition, is slipped over the relatively small locking flange 45 on the solid body portion 47 of the rim R2 into position on the body portion 47. The locking ring SL, in this instance is split as at 28, and by the use of suitable tools, is forced onto the body portion 47 into position wherein a lip or flange 51 on the locking ring SL is disposed inwardly of, and in abutting relation to, the flange 45 on the body portion 47 of the rim R2 to thereby releasably lock the ring SL and the body portion 47 of the rim R2 together.

Thereafter, the tire T is inflated which forces the beads B thereof outwardly against the locking ring SL and the similarly shaped side flange 53 of the body portion 47 of the rim R2.

It will be seen that in mounting the tire T on the wheel W and the rims R1 and R2, the tire T is, in each instance, inflated after the retaining rings SR, LR and SL, respectively, have been placed in position. The primary purpose of using retaining rings on rims and wheels of this character is to enable the relatively heavy tires with which they are used to be mounted on the rims and wheels by slipping them over relatively smooth surfaces. As a result, and so as not to defeat this purpose, the locking flanges on the wheels or rims, such as the flanges 30, 35 and 45, are normally relatively small. This of course, means that the bearing surface presented by such flanges to the retaining rings, such as the rings SR, LR and SL, for holding the latter in position is also relatively small.

As will be appreciated by those skilled in the art, the pressures to which tires of the character normally used with retaining rings are inflated is relatively high so that the pressures to which the retaining rings are subjected, are, likewise, high. Thus it will be appreciated that if, when such tires are inflated to such high pressures the "lock" between the relatively narrow flanges of the retaining rings and the body members of the wheels or rim slips or gives away due to defects of material, improper seating of the flanges, or the like, the retaining ring is often thrown from the wheel or rim with almost explosive violence.

It is during the inflating operation that the danger from such an occurrence happening is the greatest. In the first place, it is during the inflating operation that the tires are first subjected to the high pressures so that the defective mounting and the like normally appear at that time and, in addition, the very nature of inflating operation normally requires that an operator be near the tire either handling the inflating equipment or inspecting and possibly hammering the tire or rim to properly adjust the tire on the rim, so that during this time he is normally in position wherein he is particularly vulnerable to being struck by the flying retaining ring if the latter is blown off. With my novel retaining device 20, the retaining ring may be effectively held on a wheel or a rim so that if during an inflating operation the ring is dislodged from properly seated position it occurs in a harmless manner and the ring is effectively held from flying away from the tire and rim.

The safety device 20, which may be used either with wheels, such as, for example, the wheel W, Figs. 1 and 2, or with rims, such as for example, the rims R1 and R2, includes two telescopically mounted elongated body members 61 and 62, Fig. 3, the body member 61, referred to hereinafter as the outer body member, being disposed outwardly of the body member 62, herein referred to as the inner body member.

The inner body member 62 has a plurality of diametrically aligned opening 64 formed through one wall thereof, Fig. 2, for a purpose which will be discussed in greater detail presently, but preferably is otherwise of solid, continuous, square tubular construction.

The outer body member 61 has one end portion 66 having an opening 67, Fig. 2, formed through one wall thereof but, like the inner body member 62, the end portion 66 preferably is otherwise of solid, continuous, square tubular construction.

The other end portion 69 of the outer body member 61 embodies two substantially channel-shaped legs 71 and 72, Figs. 1, 5 and 6, which are pivotally mounted at their ends by means of hinges 74 and 75, respectively, to opposite sides of the end portion 66. The legs 71 and 72 may be swung on the hinges 74 and 75, respectively, toward and away from each other between closed position, as shown in Fig. 5, and separated or open position, as shown in Fig. 1. It will be understood, of course, that the legs 71 and 72 may be swung to open positions wherein the legs 71 and 72 are disposed further apart, or closer together, than they are shown in Fig. 1, and that the position shown in Fig. 1 is merely illustrative of an open position of the legs 71 and 72.

When the legs 71 and 72 are disposed in closed position, Fig. 5, the end portion 69 of the outer body member 61 forms an elongation or continuation of the end portion 66, which is of the same cross-sectional shape and size, and is in longitudinal alignment therewith.

Three substantially U-shaped guard members 77, 78, and 79, are mounted on the free ends of the inner body member 62, the leg 71, and the leg 72, respectively, by suitable means such as welding. Each of the guard members 77, 78 and 79 embodies an elongated base or web 81 and two elongated arms 82 and 83 projecting outwardly from opposite ends of the web 81 in substantially parallel spaced relation to each other. Each of the webs 81 is offset outwardly at the end portion adjacent the leg 82 (Figs. 2, 7 and 8), and, as will be noted in the drawing, the legs 82 are somewhat longer than the legs 83, as will be discussed in greater detail presently.

A latch dog 85, Figs. 1 and 2, embodying an elongated arm 87 having a pin 88 projecting downwardly from one end thereof is mounted on the end portion 66 of the outer body member 61 on the same side thereof as that in which the opening 67 is formed. The arm 87 is pivotally mounted at its center by a pin 91 extending therethrough into a bracket 92 mounted on the end portion 66 of the outer body member 61. The bracket 92 is so disposed on the end portion 66 that the pin 88 on the arm 87 is disposed in alignment with the opening 67. A compression coil spring 94 is mounted in openings 96 and 97 in the arm 87 and the bracket 92, respectively, in position to urge the arm 87 to rotate in a counterclockwise direction, as viewed in Fig. 2, so as to urge the pin 88 toward the opening 67.

The opening 67 is disposed in vertically aligned parallel relation to the line of the openings 64 so that the body members 61 and 62 may be releasably, but positively, latched by the pin 88 in any one of the plurality of positions wherein the opening 67 is disposed in axial alignment with one of the openings 64. To release the latch 88 for freeing the body members 61 and 62 for movement relative to each other, it is merely necessary to press the end portion of the arm 87, in which the spring 94 is mounted, toward the bracket 92 to thereby withdraw the pin 88 from the opening 94. Latching engagement of the pin 88 with the body members 61 and 62 may again be made by releasing the arm 87 when the opening 67 is disposed in alignment with the properly positioned hole 64.

Wheels used with large tires of the character hereinbefore referred to are in most instances of the disc-wheel type having a plurality of spaced openings formed in the faces thereof near or adjacent to the rims thereon. Such openings are provided for various purposes such as, for example, permitting access to the valve stem on the same wheel, or on a wheel which may be associated therewith in a "dual-wheel" installation. In some instances the openings are even in number and are arranged in diametrically opposed pairs. In other instances the openings are odd in number and are not diametrically opposed, this latter type of wheel being illustrated in the drawings hereof, such as, for example, in Figs. 1 and 2 where the wheel W is shown as embodying five such openings 101 therein.

Rims such as, for example, the rims R1 and R2, used with large tires of the character referred to, like other vehicle rims, are normally merely annular in form and do not embody center portions.

My novel safety device 20 may be used both readily and effectively to hold retaining rings on either such wheels or rims as will be discussed in greater detail presently.

In the use of my novel safety device 20 with a wheel such as the wheel W, the deflated tire T and the retaining ring such as, for example, the side ring SR are assembled as a unit as previously discussed. The wheel W is then preferably laid flat on the garage floor or the like with disc portion 103 thereof disposed downwardly as shown in Fig. 2. Thereafter with the tire T remaining reflated, the arm 83 on each of the guard members 77, 78 and 79, respectively, may be inserted downwardly through a respective one of the openings 101 and the body members 61 and 62 may then be adjusted outwardly relative to each other to such position that the outer faces of the webs 81 are disposed in abutting relation to the rim 24. With the safety device 20 disposed in this position, the free end portions of the arms 82 overlie the side flange 33 and the side ring SR and project a substantial distance therebeyond into relatively closely adjacent relation to the tire T, and the legs 83 project outwardly into underlying relation to the rim 24. The latch dog 85, which is disposed on the same side of the safety device 20 as the legs 82, is then engaged in the opening 67 and the proper aligned opening 64 to effectively hold the body members 61 and 62 in such position.

The guard members 77—79 are of such size that the arms 82 thereof overlie the side flange 33 and the side ring SR sufficiently closely that there is not space for the side ring SR to move outwardly between the guard members 77 and 79 and the adjacent tire T, but are preferably made of such size that they may be used with a reasonable number of different size wheels and tires.

As is best seen in Fig. 2, the legs 83, when disposed in operative underlying position relative to the rim 24, may be spaced laterally somewhat therefrom on the smaller rims. This spacing is small enough that the legs 82 are positively held against movement sufficiently far away from the rim 24 and the tire T as to permit the side ring SR to be thrown outwardly therefrom in the event of an explosion, but such spacing is sufficient that my safety device is adapted to be effectively used on rims of larger size than that shown in Fig. 2. It will be noted that each leg 83 projects outwardly beneath the rim 24 sufficiently to insure that the safety device 20 shall not move laterally an undesired amount, but is preferably shorter than the opposite leg 82 so as to facilitate insertion of the device within a rim.

After the safety device is mounted in such position on the wheel W, the tire T may be inflated and with the guard members 20 positively held in operative position thereon, it is assured that, even if the side ring SR is blown from the wheel W by the expansion of the tire T, the side ring SR is effectively confined by the guard members 77—79 so that it may not move a sufficient distance to injure the operator or other people positioned nearby.

In some instances, when there are openings 101 in the wheel W which are diametrically opposed, the operator may desire to insert the arms 83 on both of the guards 78 and 79 on the legs 71 and 72, respectively, through a single opening 101, and the guard 77 on the inner member 62 through the diametrically opposed opening 101, and this may be done if so desired, my novel safety device 20 constituting an effective device for holding retaining rings against escape whether the legs 71 and 72 are disposed apart or together.

In using my novel safety device 20 on rims, such as the rims R1 and R2 shown in Figs. 7 and 8, respectively, the respective rims R1 or R2, tires T, and locking rings LR or SL are assembled as a unit and, prior to inflating the tires T, the safety device 20 is mounted in the rim R1 or R2 and adjusted to a position wherein the guard members 77, 78 and 79 are disposed around the rims R1 or R2, the arms 82 project a substantial distance therebeyond into relatively close overlying relation to the tire T as hereinbefore discussed with respect to the wheel W, and the arms 83 underlie the inner edge portions of the rims R1 or R2, as best shown in Figs. 7 and 8, in position to positively retain the safety device 20 and the arms 82 thereof, in operative position wherein the retaining rings LR and SR, respectively, are effectively held against being thrown from the rims.

In the use of the safety device 20 on such rims, the operator may leave the legs 71 and 72 together, as shown in Fig. 5, and merely adjust the guard member 77 and the guard member 78 and longitudinally outwardly into operative retaining engagement on the rim, or he may spread the legs 71 and 72 outwardly and adjust the guard members into operative retaining engagement on the rim in positions wherein each of the guard members 77—79 is spaced from each of the other guard members 77—79. As previously mentioned the safety device 20 is effective with the legs 71 and 72 disposed in either closed or spread relation.

With the safety device 20 mounted on either the rim R1 or the rim R2 in either of the aforementioned positions, inflation of the tire T may be accomplished with the safety device 20 assuring that the retaining ring, such as the lock rings LR or SL, shall be held from being explosively ejected from the rims R1 and R2 and injuring the operator or other persons in the vicinity.

It will be appreciated that, although, the drawings disclose basic types of wheels, rims, and retaining rings, this is merely by way of illustration, and my invention is not limited thereto and that my invention is equally effective on other types of wheels and rims available on the market most of which include retaining rings which are merely variations or combinations of side rings and lock rings as shown herein.

From the foregoing it will be seen that I have afforded a novel safety device which affords a novel, practical and effective device for insuring that retaining rings shall not be thrown from a wheel or rim to endanger nearby persons during inflation of a pneumatic tire on such wheel or rim.

Thus, while I have illustrated and described the preferred embodiment of my invention, it is to be understood that this is capable of variation and modification.

I claim:

1. A safety device for preventing retaining rings from being thrown from pneumatic tire-receiving members such as rims and wheels, said safety device comprising two elongated members, said members being telescopingly mounted relative to each other with one of said members disposed outwardly of the second of said members, means mounted on said members for releasably holding said members in adjusted position relative to each other, each of said members including a free end portion projecting away from the other of said members, said free end portion of said one member comprising two elongated legs pivotally mounted at one end to the other end of said one member for swinging movement toward and away from each other, each of said legs having a free end, and guard members mounted on said free ends of said other member and said legs, said guard members each comprising two substantially parallel spaced arms projecting outwardly from said other member and said legs in position to receive oppositely-disposed outer side portions of such tire receiving members therebetween.

2. A safety device for preventing retaining rings such as side-rings and locking rings, from being thrown from pneumatic tire-receiving members such as independent rims and integral rim members or wheels during inflation of such a tire on the tire-receiving member, said safety device comprising an elongated member having a polygonal cross-section, a second elongated member having a polygonal cross-section, said other member being slidably and non-rotatably mounted in said first mentioned member for longitudinal sliding movement into and out of said first mentioned member, means mounted on said first mentioned member and engageable with said second member for releasably holding said members in adjusted position relative to each other, each of said members including a free end portion projecting away from the other of said members, said free end of said first mentioned member comprising two elongated legs hingedly mounted on the other end thereof, said legs being of channel-shaped cross-section and being pivotable toward and away from each other into closed and open position, said legs when disposed in said closed position forming a longitudinal extension of said other end of said first mentioned member of substantially the same cross-sectional size and shape and in longitudinal alignment therewith, each of said legs having an outwardly disposed free end, and a plurality of substantially U-shaped guard members, each of said guard members comprising an elongated web member, and two substantially flat parallel arms, each of said arms projecting outwardly from a respective end of said web member, each of said guard members being mounted on the respective free end of said second member and said legs, with said web disposed in abutting relation to said free end and with said arms projecting outwardly therefrom in spaced apart relation to receive therebetween a portion of such a tire-receiving member and the retaining ring and tire mounted on said tire-receiving member.

3. A safety device for preventing retaining rings such as side-rings and locking rings, from being thrown from pneumatic tire-receiving members such as independent rims and integral rim members or wheels during inflation of such a tire on the tire-receiving member, said safety device comprising an elongated member, a second elongated member, said second member being slidably mounted in said first mentioned member for longitudinal sliding movement into and out of said first mentioned member, means mounted on said first mentioned member and engageable with said second member for releasably holding said members in adjusted position relative to each other, each of said members including a free end portion projecting away from the other of said members, and substantially U-shaped guard members, each of said guard members comprising an elongated web member, and two spaced arms, one of said arms being longer than the other, said arms projecting outwardly from respective ends of said web member and having outer ends disposed from each other a distance greater than the width of said tire-receiving members, each of said guard members being secured on the respective free end of said elongated members, with said web disposed in abutting relation to said free end and with said arms projecting outwardly therefrom in spaced apart relation to receive therebetween a portion of such a tire-receiving member and the retaining ring and tire mounted on said tire-receiving member.

References Cited in the file of this patent

UNITED STATES PATENTS

| | | |
|---|---|---|
| 1,317,136 | Howell | Sept. 23, 1919 |
| 1,414,879 | Hughes | May 2, 1922 |
| 1,434,244 | Berry et al. | Oct. 31, 1922 |
| 1,540,503 | Schofield | June 2, 1925 |
| 1,768,206 | Lemons et al. | June 24, 1930 |
| 2,463,842 | Woods | Mar. 8, 1949 |
| 2,476,209 | Monheit | July 12, 1949 |
| 2,490,612 | Ballard | Dec. 6, 1949 |
| 2,609,037 | Titus | Sept. 2, 1952 |